United States Patent
Weinl et al.

(10) Patent No.: US 9,300,192 B2
(45) Date of Patent: Mar. 29, 2016

(54) ELECTROMAGNETIC ACTUATING DEVICE WITH ABILITY FOR POSITION DETECTION OF AN ARMATURE

(71) Applicant: ZF Friedrichshafen AG, Friedrichshafen (DE)

(72) Inventors: Florian Weinl, Lindau (DE); Michael Linder, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 543 days.

(21) Appl. No.: 13/714,557

(22) Filed: Dec. 14, 2012

(65) Prior Publication Data

US 2013/0241320 A1    Sep. 19, 2013

(30) Foreign Application Priority Data

Mar. 19, 2012  (DE) .......................... 10 2012 204 321

(51) Int. Cl.
*H02K 11/00* (2006.01)
*H01F 7/16* (2006.01)
*H01F 7/18* (2006.01)

(52) U.S. Cl.
CPC .......... *H02K 11/0031* (2013.01); *H01F 7/1607* (2013.01); *H01F 7/1844* (2013.01); *H01F 2007/1692* (2013.01); *H01F 2007/185* (2013.01)

(58) Field of Classification Search
CPC ... H02K 11/0031; H02K 33/10; H02K 33/12; H02K 33/14; H01F 7/1607; H01F 7/1844; H01F 2007/1684; H01F 2007/1692; H01F 2007/185; H01F 2007/1861
See application file for complete search history.

(56) References Cited

U.S. PATENT DOCUMENTS

| | | | | |
|---|---|---|---|---|
| 3,789,876 A | * | 2/1974 | Kempton et al. | 137/554 |
| 4,422,060 A | * | 12/1983 | Matsumoto et al. | 335/256 |
| 5,629,619 A | | 5/1997 | Mednikov | |
| 5,804,962 A | * | 9/1998 | Kather et al. | 324/207.16 |
| 2011/0221451 A1 | | 9/2011 | Pantke et al. | |
| 2013/0043740 A1 | * | 2/2013 | Xu et al. | 310/12.04 |
| 2014/0117911 A1 | * | 5/2014 | Lamprell | 318/490 |

FOREIGN PATENT DOCUMENTS

| | | |
|---|---|---|
| DE | 42 25 968 A1 | 2/1994 |
| DE | 10 2008 043 340 A1 | 5/2010 |
| WO | WO 2011098353 A1 * | 8/2011 |

* cited by examiner

*Primary Examiner* — Quyen Leung
*Assistant Examiner* — Eric Johnson
(74) *Attorney, Agent, or Firm* — Davis & Bujold, P.L.L.C.; Michael J. Bujold

(57) ABSTRACT

An electromagnetic control device has a coil with a central axis and an interior space, and a control element that moves along the axis and is arranged at least partially within an interior space of the coil. The control element comprises an armature that axially moves to a desired position when the coil is energized. The coil is divided into at least two separate portions that are arranged axially behind one another and connected electrically in series with one another. An electric central tap is provided, between two adjacent coil portions, by which a sensor current, provided for determining an axial position of the armature, can be fed into a subset of the coil portions. When the armature is in a defined axial position, an axial end face of the armature is located within an axial area determined by an axial separation zone provided between two adjacent coil portions.

14 Claims, 3 Drawing Sheets

ELECTROMAGNETIC ACTUATING DEVICE WITH ABILITY FOR POSITION DETECTION OF AN ARMATURE

This application claims priority from German patent application serial no. 10 2012 204 321.7 filed Mar. 19, 2012.

FIELD OF THE INVENTION

The invention concerns an electromagnetic control device with an electric coil that has a central longitudinal axis and surrounds an inside space of the coil, and with a control element which is arranged at least partially in the inside space of the coil and can move along the central longitudinal axis.

BACKGROUND OF THE INVENTION

An electromagnetic control device of that type can be an actor. Other terms commonly used in control technology for an actor are actuator, control motor and/or lifting magnet. Such a component serves, for example, for driving or moving valves or flaps to control the flow of gaseous or liquid media. A possible field of use in this case is automotive technology.

For accurately timed actuation of the control device a knowledge of the position of the control element, or the armature which is part of the control element, is often important.

DE 10 2008 043 340 A1 describes a method for detecting the position of an armature of an electromagnetic actuator, which is arranged to move between two coils. The use of two coils with an intermediate space within which the armature moves entails providing a relatively large fitting volume.

Furthermore, DE 42 25 968 A1 describes a method for contactless displacement measurement. A measuring coil with a number of voltage tapping points arranged one after another in the longitudinal direction is provided. The coil is surrounded by an electrically or magnetically conducting, annular measurement object. This ring can be displaced outside and over the coil in its longitudinal direction. Its axial dimension is at most as large as the distance between two of the coil's tapping points. It consists of a material with low specific electrical resistance, such as aluminum. In particular because of this preferred choice of material, the measurement method cannot easily be converted for determining the position of a longitudinally movable, ferromagnetic armature of an electromagnetic control device.

In other known methods for detecting the position of the armature of a control device the control element is connected mechanically by way of a sensor tappet rod to an external position sensor of virtually any desired type. This again requires a relatively large fitting volume. In many applications, moreover, the space needed for the external position sensor is not available.

Furthermore, embodiments of control devices are also known which comprise a sensor coil intended exclusively for measurement purposes. The measurement coil can be arranged in the inside space of the main coil provided for displacing the position of the armature, coaxially with the main coil. Thus, the inside coil space of the main coil must provide extra space for the separate sensor coil, and this increases the overall fitting volume of the control device.

SUMMARY OF THE INVENTION

Thus, an objective of the present invention is to indicate a control device of the type previously mentioned, which has the ability to detect the position of the control element or an armature of the control element, but which occupies only a small fitting volume.

This control device is one in which the control element comprises an armature, whose axial position can be changed by passing a movement current through the coil, the coil being divided into at least two part-coils spatially separate from one another, arranged axially one behind another and electrically connected in series, with an electric central tapping connection in each case provided between two adjacent part-coils, by means of which a sensor current provided for determining an axial position of the armature can be passed into a subset of the part-coils, and when the armature is in a defined axial position an axial end face of the armature is within an axial range defined by an axial separation zone provided between two adjacent part-coils. In particular, this defined axial position can be a predefined fixed position.

In the control device according to the invention the coil has a dual function. On the one hand it serves to vary the position of the armature and hence also that of the control element of which the armature is a part. To vary the position of the armature a movement current is passed through the coil by way of two main electric contacts preferably positioned at the two axial ends of the coil. In this context "axial" means an orientation along or in the direction of the central longitudinal axis. Correspondingly, "radial" means an orientation perpendicular to the central longitudinal axis and "tangential" means an orientation in the circumferential direction relative to the central longitudinal axis. On the other hand, the coil is also designed to detect the position of the armature. For this, only a subset of the part-coils, i.e. in particular not the entire coil, is fed with a sensor current, for which purpose at least one of the central tapping points provided in each case between two adjacent part-coils is used.

Because of the dual use of the coil both for position displacement and position detection, compared with a control device without position detection ability, the fitting volume required by the control device according to the invention is hardly any different. The axial separation zone between two adjacent part-coils can be made very narrow and therefore entails only a comparatively small additional volume. Consequently, notwithstanding its ability to detect the position of the armature, the electromagnetic control device according to the invention can be made very compact.

In particular, the coil can be divided into only two part-coils. Correspondingly, in this preferred embodiment only a single electric central tapping point is provided. The sensor current is then passed through the first or second part-coil. Despite the multi-part configuration of the coil, it preferably still consists of a single overall component whose part-coils are in particular produced in a single winding process.

Since the separation zone between two axial part-coils is located exactly within an axial region in which the axial end face of the armature is also arranged, when the latter is in a defined position the following situation exists: adjacent to the axial end face there is in particular a material-free air gap area, so that at this boundary surface there is thus a significant material change from the in particular ferromagnetic material of the armature to the ambient air in the air gap. Within the inside space of the coil this is the material change that has the greatest influence on the magnetic situation. Since the separation zone between two adjacent part-coils is also located precisely at the position of this significant material change, the information content of the measurement signals that can be obtained from the coil for determining the position of the armature is particularly high and easy to evaluate. Accordingly, the position of the armature and hence of the control element can be determined particularly efficiently and accurately.

A favorable design is one in which the defined axial position is a starting or an end position of the armature. The starting and end positions are specifically the extreme positions between which the armature can move axially, or normally moves during operation. The starting or end position can be set by a mechanical or electronic end-stop. In this context an electronic end-stop is preferably designed as a monitoring function that monitors a control command at the actuator (for example the energizing of the coil with a movement current) and only enables this if it results in a movement of the armature within the specified starting and end positions. Otherwise, the monitoring function either blocks the control command completely or permits it only as far as the specified starting or end position concerned. The starting or end positions are in particular positions in which the armature is held stable, preferably also precisely when no movement current is flowing in the coil. If the armature is held stable in an intermediate position between the starting or end positions when no movement current is flowing in the coil, then this intermediate position (which need not necessarily be geometrically exactly mid-way between the starting and end positions) can also be the defined axial position. In an evaluation for determining the position of the armature, reference to the particularly identified armature positions contributes toward enabling access to well known and defined proportions, by virtue of which the position can be determined with particular precision.

In another favorable design the axial separation zone is a free, in particular unfilled intermediate space. This further reduces the, in any case, small space required for the intermediate zone.

In an alternative design, however, a separate, in particular ring disk shaped separating component can also be arranged in the axial separation zone. This makes it possible to ensure, particularly during the coil-winding process, that the desired separation between the adjacent part-coils is maintained without error.

In a further favorable design, the coil comprises more than two part-coils, thus enabling a still more precise determination of the axial armature position.

According to another favorable design feature, the central tap has a lower current-carrying capacity than the two main electric connections also used for feeding in the movement current. Specifically, the central tap has a smaller conductor cross-section than the two main electric connections. This measure allows the space needed for the central tap to be reduced. The central tap can have a lower current-carrying capacity since through it, preferably, only the sensor current has to be passed and the sensor current has a lower maximum current strength than the movement current, which is designed to displace the position of the armature and which passes in and out, in particular, by way of the two electric main connections.

In a further favorable design, the armature is provided with an electrically conducting ring. This reinforces the analyzable information content of the measurement signal that can be picked up for position determination. It is particularly favorable for the ring to be close to the axial end face of the armature.

According to another favorable design, the electrically conducting ring is fitted onto the armature and in particular extends radially above an outer circumferential surface of the armature. This embodiment can be produced very simply, since the shape of the armature itself need not be changed in any way. The ring additionally provided can simply be pushed on.

In a further favorable design, the electrically conducting ring is set into the armature and in particular into a groove formed in the outer circumferential surface of the armature. This version does not entail increasing the external dimensions of the armature because of the additionally provided ring. That is favorable in relation to a small overall volume of the control device.

According to a further design the electrically conducting ring can also have self-lubricating properties. Thanks to the associated lubrication function, for example a friction coefficient of the guide and/or mounting of the armature within the inside space of the coil can be reduced. Thus, the electrically conducting ring preferably consists of bronze or brass and can also have a multi-layer structure corresponding to that of a slide bearing.

In another favorable design, the coil is connected to a control unit via two main electric connections and via at least one of the central taps provided between two adjacent part-coils. The control unit is designed to feed the movement current into the coil via the main connections during a movement operating mode in order to change the axial position of the armature, and during a sensor operating mode to feed the sensor current by way of the at least one central tap into a subset of the part-coils, to measure at least one coil potential produced at the main connections and/or at the central tap by the sensor current, and with reference to the coil potential measured, to determine an actual, current inductance value and from that the actual, current axial position of the armature. With the control unit described here these two very different operating modes can be implemented equally well and reliably, without requiring essentially any additional components and/or without occupying essentially any additional fitting volume.

A further objective of the invention is to indicate an operating method for a control device by means of which the position of an armature can also be determined in a simple and space-saving manner.

The method serves for the operation of a control device corresponding to the above-described design according to the invention or its advantageous design features. According to this method, a movement current is passed into the coil in order to change the axial position of the armature (=movement operation mode). Furthermore, using the at least one central tap, a sensor current is passed into a subset of the part-coils and at least one coil potential produced by the sensor current is measured in order to determine, with reference to the measured coil potential, an actual, current inductance value and from that the current position of the armature (=sensor operation mode). The method has essentially the same properties, advantages and preferred design features as the control device described above. In this case the movement operation mode and the sensor operation mode are preferably carried out successively, i.e. at different times. The separation then takes place, for example, by means of different operating frequencies.

The characteristics specified in the example embodiments of the control device according to the invention and its operating method are in each case suitable, whether considered alone or in combination with one another, to develop further the object according to the invention. In relation to the further development of the object of the invention, the respective combinations of characteristics have no restrictive force but are presented only as examples.

The control device can in particular be one used in a motor vehicle, for example a passenger car or a truck. Accordingly the control device can serve for selecting a shifting gate in a motor vehicle transmission or can carry out other control tasks in the vehicle transmission (for example the coupling or uncoupling of drive input or output shafts of the transmission, the engagement of transmission gears, or the engagement or disengagement of locks). The vehicle transmission is in particular a transmission in the drive-train of the vehicle by virtue of which the vehicle is propelled. The control device can also serve for the adjustment of a fluid pressure or through-flow rate in the vehicle (for example in a pneumatic, hydraulic, heating or cooling system). Likewise, other suitable control tasks can be carried out by the control device, even in other technological fields.

BRIEF DESCRIPTION OF THE DRAWINGS

Further characteristics, advantages and details of the invention emerge from the following description of example embodiments, given with reference to the drawings, which show.

DETAILED DESCRIPTION OF THE PREFERRED EMBODIMENTS

In FIGS. 1 to 8 corresponding parts are given the same indexes. Details of the example embodiments explained more fully below can also, in their own right, be regarded as an invention or can be part of the object of an invention.

Figure 1:
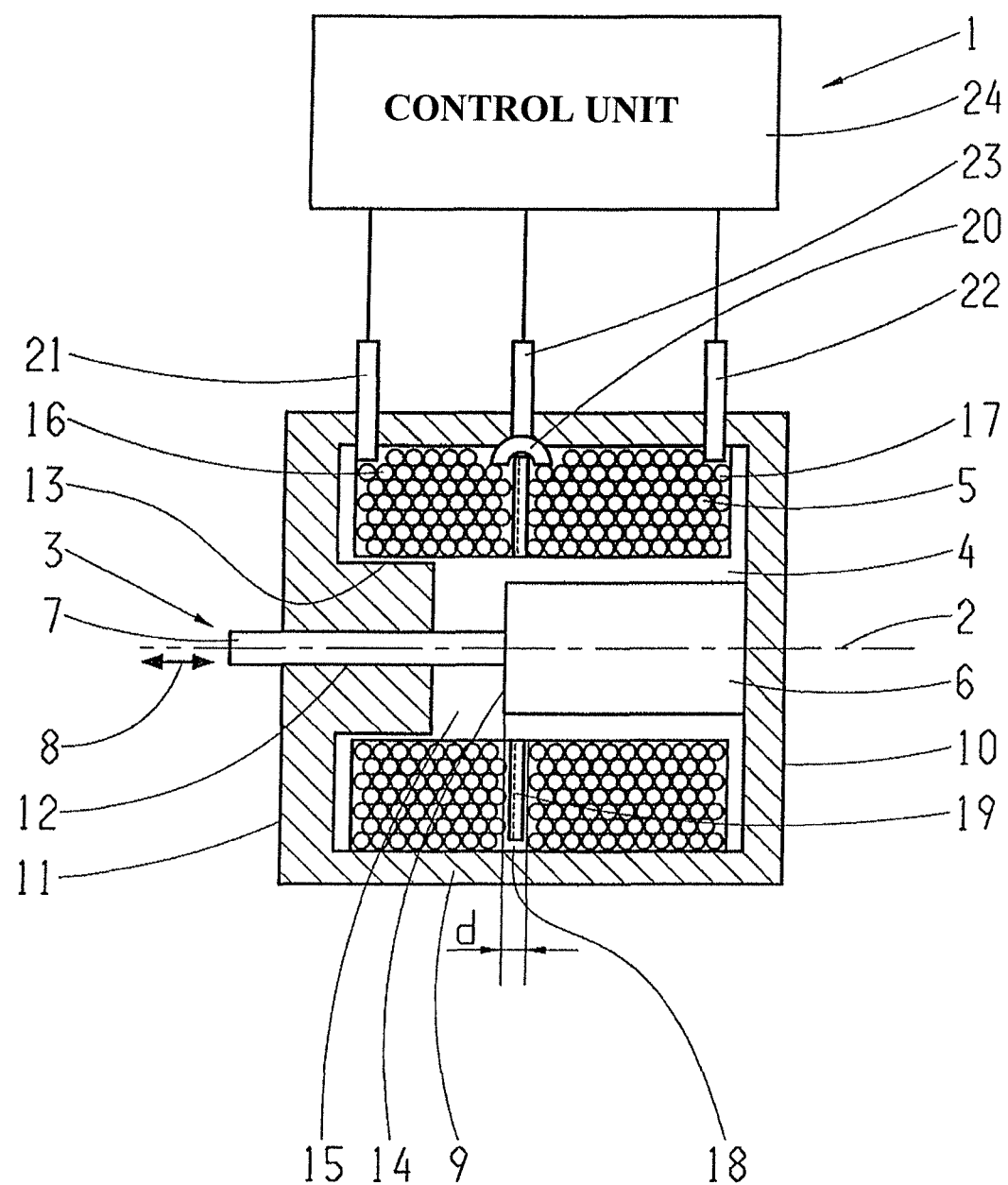
FIG. 1: A first example embodiment of an electromagnetic control device with a divided coil for armature position determination.

FIG. 1 shows an electromagnetic control device 1 which comprises a control element 3 that can move along a central longitudinal axis 2 and that is arranged at least partially within the coil inside space 4 of an electric coil 5. The longitudinally moving control element 3 comprises an armature 6 and a control rod 7. In particular, as part of the control element 3 the armature 6 is within the inside space 4 of the coil. The longitudinal mobility of the control element 3 is indicated by the double arrow 8.

The coil 5 is arranged in a housing that comprises an approximately cylindrical outer shell 9 and axial end covers 10 and 11. The end cover 11 has an opening 12 through which the control rod 7 passes to the space outside the housing. On the side of the axial end cover 11 facing toward the inside space 4 of the coil, a projection 13 is formed integrally, which extends into the coil's inside space 4. Thus, the projection 13 also forms a partial coil core.

The projection 13 and the end cover 10 on the other axial side of the coil 5 form respective stops for the armature 6. The armature 6 can move back and forth between these two stops.

Basically, it is possible for the armature 6 to be held or retained in at least one of the two end positions defined by the stops by an additional force, for example a spring force or a magnetic force produced for example by a component not shown in the schematic illustration of FIG. 1. In the condition represented in FIG. 1, the armature 6 is in its first end position (=initial or starting position) against the end cover 10. In this condition an air gap 15 is formed between the projection 13 and the axial end face 14 of the armature 6 facing the projection 13.

The coil 5 is divided into two parts. It comprises a first part-coil 16 and a second part-coil 17. These two part-coils 16, 17 are arranged next to one another and one behind the other. They are spatially separated from one another by an axial separation zone 18. In the example embodiment shown a separate, disk ring shaped separating component 19 is positioned in the separation zone 18. However, this separating component 19 need not necessarily be present. Rather, in an alternative example embodiment (not shown) the separation zone 18 is an unfilled, free intermediate space.

The axial separation zone 18 has an axial width d and extends within an axial area in which the axial end face 14 of the armature 6 is also located when—as shown in FIG. 1—the armature 6 is in its first end position which is a fixed, defined position of the armature.

The two part-coils 16 and 17 are connected in series by an electric connection 20. At its two axial ends the coil 5 has two main electric connections 21 and 22, and in addition a central tap 23 which is connected electrically to the connection 20. The main connections 21, 22 and the central tap 23 are electrically connected to a control unit 24 which, in particular, is also part of the electromagnetic control device 1. The main connections 21, 22 have a larger conductor cross-section and greater current-carrying capacity than the central tap 23.

The coil 5 fulfills a dual function. On the one hand it serves to displace the armature 6 longitudinally. For this purpose, in a movement operation mode an electric movement current is fed by the control unit 24 via the main connections 21, 22 into the whole coil 5, i.e. into both part-coils 16 and 17. This produces a magnetic flux in the coil's inside space 4, and due to the effort to reduce the magnetic resistance in the air gap area 15 the armature 6 moves toward the projection 13. Thus, the fixed projection 13 also forms a yoke. The same applies to the likewise fixed axial end cover 10.

The components arranged in the magnetic flux circuit contain in particular a ferromagnetic material, or indeed consist of such a material. This applies at least to the armature 6 and the projection 13 but if necessary also to the end covers 10, 11 and the shell 9.

A second function of the coil 5 concerns the determination of the current position of the control element 3 and in particular the armature 6. This information is important in many applications in which the electromagnetic control device 1 is used. To do this, the coil 5 is operated in a sensor operation mode which will be described in more detail below with reference to FIGS. 2 to 6.

Figure 2:
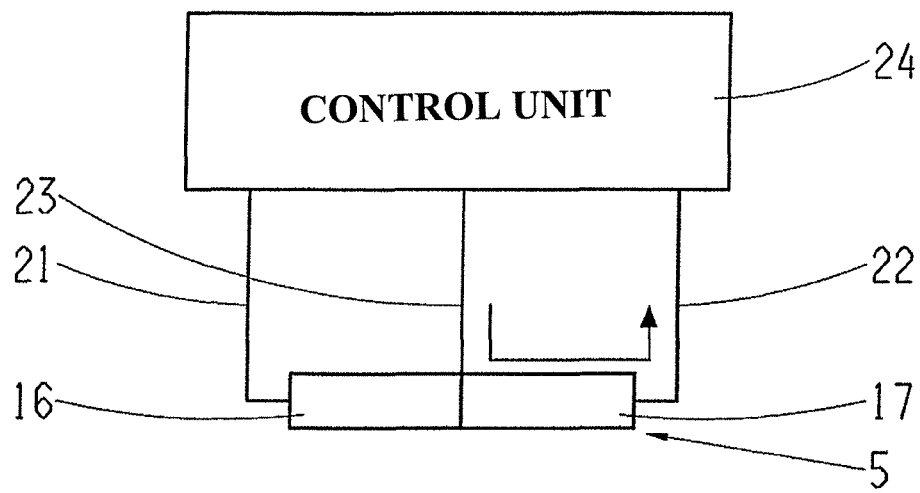
FIG. 2: A schematic representation of a divided coil of the control device in FIG. 1, connected to a control unit.

The illustration in FIG. 2 is in essence a schematic representation of the electromagnetic control device 1 showing only the control unit 24 and the coil 5 with its two part-coils 16, 17, the main connections 21, 22 and the central tap 23.

Figure 3:
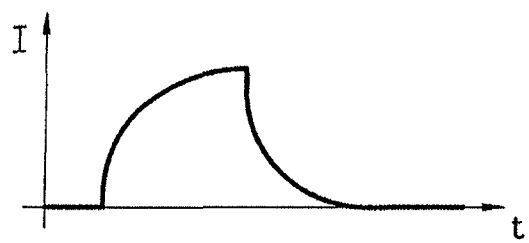
FIG. 3: A measurement curve showing the time variation of a sensor current fed into part of the coil of the control device in FIG. 1 during a sensor operation phase.
Figure 5:
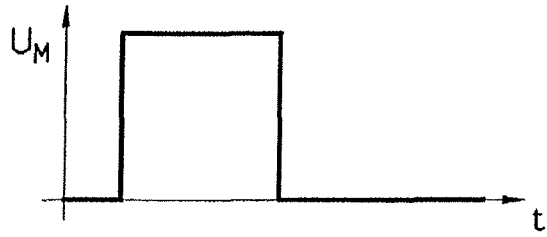
FIG. 5: A measurement curve showing another time variation of a coil potential produced at the main connections and at the central tap of the coil of the control device in FIG. 1 during a sensor operation phase.
Figure 6:
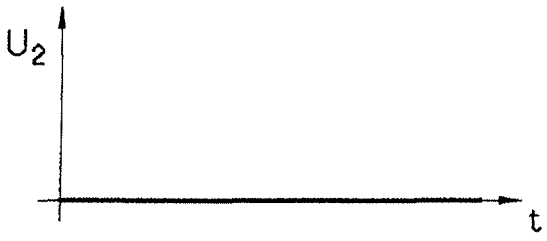
FIG. 6: A measurement curve showing yet another time variation of a coil potential produced at the main connections and at the central tap of the coil of the control device in FIG. 1 during a sensor operation phase.

By means of the control unit 24, the potential signal $U_M$ whose rectangular time variation is represented in FIG. 5 is applied to the central tap 23. At the same time the potential $U_2$ shown in FIG. 6, which is the zero potential, is applied at the second main electric connection 22. As a result of these applied potentials, the time variation of the sensor current I shown in FIG. 3 is produced in the second part-coil 17. The sensor current I is fed in by the control unit 24 and enters and leaves, respectively, by way of the central tap 23 and the main connection 22. In contrast, the first part-coil 16 carries no current, at least none fed in directly by the control unit 24.

Figure 4:
FIG. 4: A measurement curve showing the time variation of a coil potential produced at the main connections and at the central tap of the coil of the control device in FIG. 1 during a sensor operation phase.

Due to the sensor current I flowing in the second part-coil 17, a magnetic field is produced. The time-variable magnetic field induces a voltage in the initially current-free first part-coil 16, so that at the first main connection 21 the potential variation $U_1$ with time, shown in FIG. 4, is produced and can be detected in the control unit 24. The potential variation $U_1$ depends on the inductance of the coil arrangement as a whole. The inductance of the coil arrangement is determined among other things by the position of the armature 6 at the time. Depending on the armature position a different inductance value and hence also a different potential variation $U_1$ is produced. For example, the potential variation $U_1$ represented in FIG. 4 by the continuous line is obtained when the armature 6 is in its second end position, i.e. with its end face 14 against the projection 13. In contrast the potential variation $U_1$ represented in FIG. 4 by the broken line is obtained when the armature 6 is in its first end position, i.e. in contact with the end cover 10 on the right (see the condition shown in FIG. 1). Accordingly, the potential variations $U_1$ that can be detected at the main connection 21 are variable. Thus, the signal variation detected by the control unit 24 can be evaluated from that standpoint in order, from the measured values, to determine the actual position of the armature 6 and hence that of the control element 3.

In particular, for this position determination no additional components are needed. The coil 5 is in any case needed for the position displacement of the armature 6. Only, it is made in two parts. The resulting two part-coils 16, 17 are used in the manner described for determining the position of the armature by feeding suitable interrogation signals into the part-coils 16, 17 and, resulting from these, detecting and evaluating response signals at the main connections 21, 22 and/or at the central tap 23.

Thus, the electromagnetic control device 1 can be made with a very small fitting volume. Furthermore it enables very exact determination of the position of the armature 6. The latter is also obtained owing to the related, particularly advantageous positional correlation of the axial end face 14 of the armature 6 with the axial position of the separation zone 18. Namely, if the axial separation zone 18 is located precisely at the axial position where the material change between the armature 6 and the air gap area 15 occurs, a particularly significant measurement or response signal results, from which the position of the armature 6 can be determined very accurately.

Basically, in other example embodiments (not shown) the coil 5 can be divided into more than two part-coils. This increases the precision of the position determination.

Figure 7:
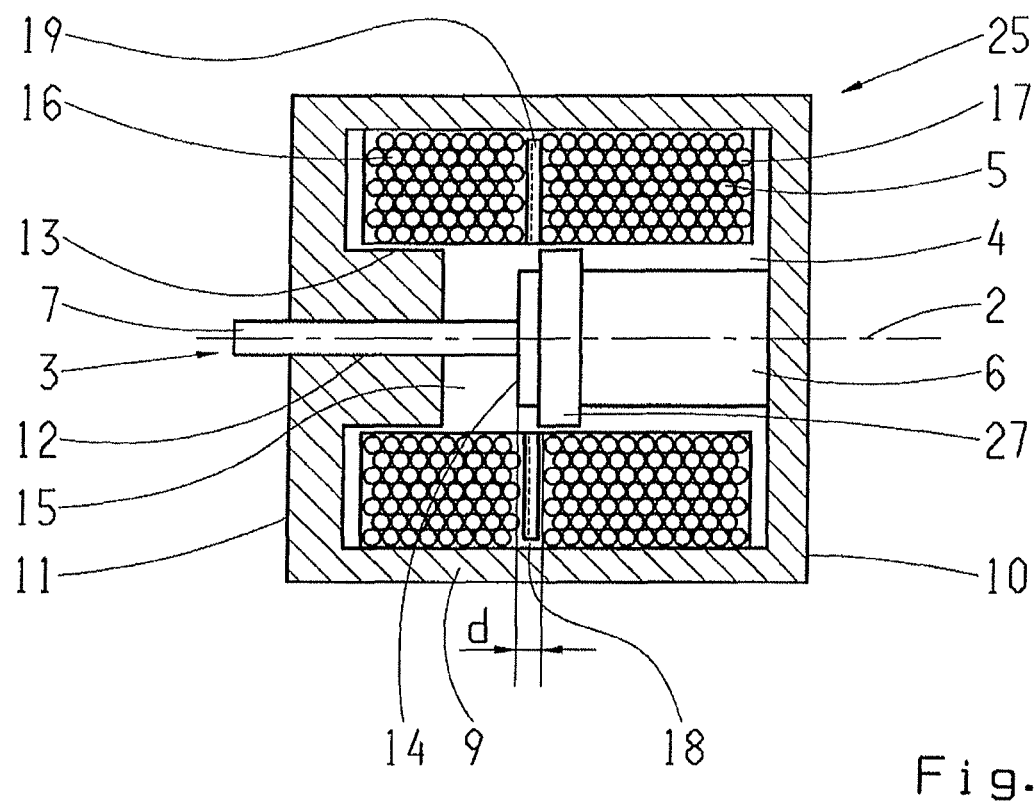
FIG. 7: A second example embodiment of an electromagnetic control device with a divided coil for armature position determination and with an electrically conducting ring arranged on the armature.
Figure 8:
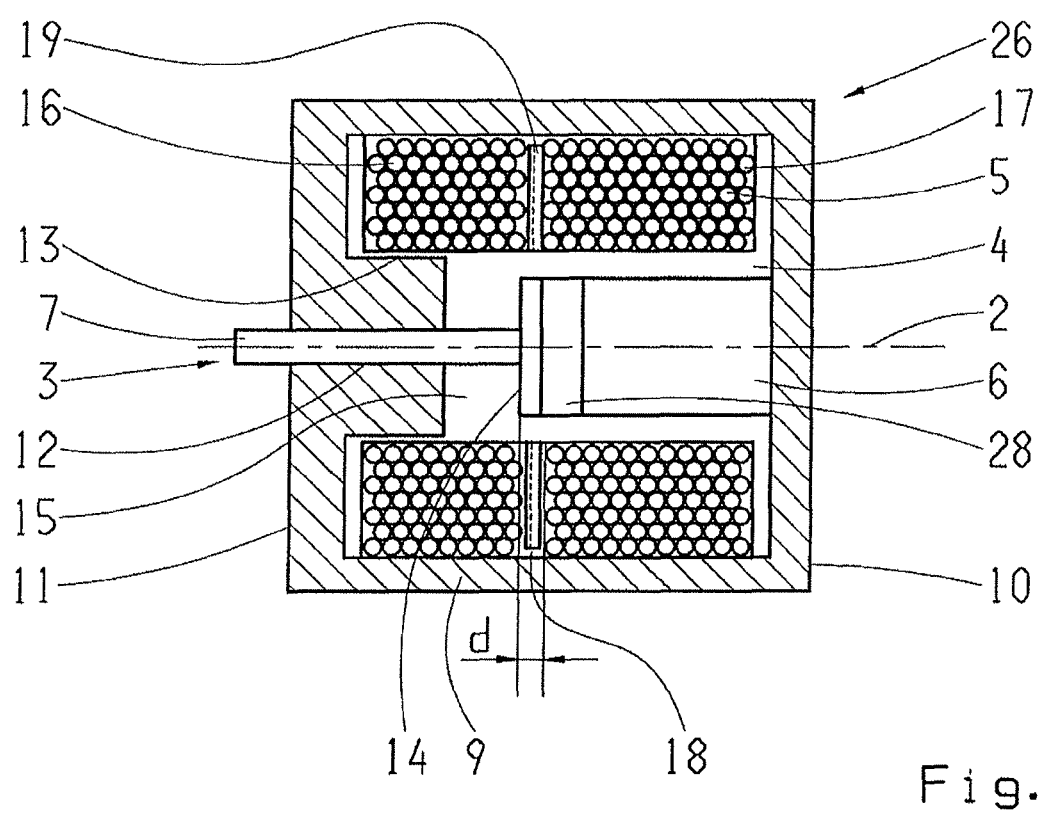
FIG. 8: A third example embodiment of an electromagnetic control device with a divided coil for armature position determination and with an electrically conducting ring imbedded in the armature.

In the further example embodiments of electromagnetic control devices 25 and 26 shown in FIGS. 7 and 8 the armature 6 is provided with an electrically conducting ring, 27 or 28 respectively. Apart from the ring 27 or 28 the two control devices 25 and 26 are no different from the control device 1 of FIG. 1. Accordingly, and to simplify the representation, the control unit 24 and its electric connections to the coil 5 are not reproduced again in FIGS. 7 and 8. However, these components are also present in the modified example embodiments just as in the control device 1.

In the control device 25 shown in FIG. 7, the ring 27 is pushed onto the outer circumferential surface of the armature 6. It extends upward radially over the rest of the armature's outer circumferential surface. The ring 27 is in particular made of a material with self-lubricating properties, so that it fulfils an additional lubricating function for the longitudinal guiding of the armature 6 within the coil's inside space 4.

In contrast, the ring 28 of the control device 26 shown in FIG. 8 is embedded in the armature 6. For this, a groove is provided in the outer circumferential surface of the armature 6 into which the ring 28 is set, so that it does not project radially above the outer circumferential surface of the armature 6.

The rings 27 and 28 serve above all also to increase the information content that can be determined from the measurement signals, about the current position of the armature 6. In this respect it is particularly advantageous for the ring 27 or 28 to be located close to the axial end face 14 and thus also close to the separation zone 18. In particular, the ring 27 or 28 is therefore, as can also be seen in FIGS. 7 and 8, positioned in the front third of the armature 6 next to the axial end face 14. The amplifying effect on the information content of the measurement signals that can be detected is then particularly high.

All in all, the electromagnetic control devices 1, 25 and 26 are in each case very compact components requiring little fitting space, which despite this enable very precise determination of the current position of the armature 6 and hence of the control element 3.

INDEXES

1 Electromagnetic control device
2 Central longitudinal axis
3 Control element
4 Inside space of coil
5 Coil
6 Armature
7 Control rod
8 Double arrow
9 Cylindrical outer shell
10 Axial end cover
11 Axial end cover
12 Through-going opening
13 Projection
14 Axial end face
15 Air gap area
16 First part-coil
17 Second part-coil
18 Separation zone
19 Separating component
20 Electric connection
21 Main electric connection
22 Main electric connection
23 Central tap
24 Control unit
25 Electromagnetic control device
26 Electromagnetic control device
27 Electrically conducting ring
28 Electrically conducting ring

The invention claimed is:

1. An electromagnetic control device defining a central longitudinal axis (2) and with an electric coil (5) surrounding an inside space (4) of the coil, and comprising a control element (3) that is arranged at least partially within the inside space (4) of the coil and is movable along the central longitudinal axis (2),
the control element (3) comprising an armature (6) that is axially and variably movable by energizing the coil (5) via a movement current,
the coil (5) being divided into at least two part-coils (16, 17) that are electrically connected in series by an electric connection and arranged axially adjacent one behind the other but are separated from one another,
an electric central tap (23) is connected to the electric connection between the two part-coils (16, 17) and transmits a sensor current (I) into one of the two part-coils for determining an axial position of the armature (6), and
when the armature (6) is in a defined axial position, an axial end face (14) of the armature (6) is within an axial area determined by an axial separation zone (18) provided between the two part-coils (16, 17).

2. The control device according to claim 1, wherein the defined axial position is one of a starting position, an end position and an intermediate position of the armature (6).

3. The control device according to claim 1, wherein the axial separation zone (18) is a free intermediate space.

4. The control device according to claim 1, wherein a separate separating component (19) is arranged in the axial separation zone (18).

5. The control device according to claim 1, wherein the coil (5) comprises at least three part-coils (16, 17).

6. The control device according to claim 1, wherein each axially opposite end of the coil comprises a main electrical connection, the main electrical connections of the coil have a larger conductor cross-section and a greater current-carrying capacity than the central tap (23), and the main electric connections (21, 22) of the coil (5) also transmit the movement current.

7. The control device according to claim 1, wherein the armature (6) is provided with an electrically conducting ring (27, 28).

8. The control device according to claim 7, wherein the electrically conducting ring (27, 28) is one of positioned on the armature (6) or embedded in the armature (6).

9. The control device according to claim 7, wherein the electrically conducting ring (27) is self-lubricating.

10. The control device according to claim 1, wherein the coil (5) is connected to a control unit (24) by way of two main electric connections (21, 22) and by the central tap (23) provided between two adjacent part-coils (16, 17), and the control unit (24) is designed:
during a movement operation mode, to feed the movement current into the coil (5), via the main electric connections (21, 22), so as to vary the axial position of the armature (6), and
during a sensor operation mode, using the at least one central tap (23), to feed the sensor current (I) into one part-coil (17) of the two adjacent part-coils,
and to measure at least one of a coil potential (U1), produced by the sensor current (I) at least one of the main connections (21) and at the central tap, in order to determine, with reference to the measured coil potential (U1), an actual inductance value and hence a current axial position of the armature (6).

11. A method of operating a control device (1; 25; 26) with an electric coil (5), which surrounds an inside space (4) of the coil, and defines a central longitudinal axis (2), and further comprising a control element (3) that is movable along the central longitudinal axis (2) and is arranged at least partially within the inside space (4) of the coil, the control element (3) comprises an armature (6) that is axially and variably movable by energizing the coil (5) via a movement current, the coil (5) is divided into at least two part-coils (16, 17) that are spatially separated from one another, arranged axially adjacent one behind the other and electrically connected in series, and an electric central tap (23) is provided between the two part-coils (16, 17), via which a sensor current (I), provided for determining an axial position of the armature (6), is transmitted to a first part-coil (17) of the two part-coils, when the armature (6) is in a defined axial position, an axial end face (14) of the armature (6) is within an axial area determined by an axial separation zone (18) provided between the two part-coils (16, 17), the method comprising:
transmitting the movement current into the coil (5) to change the axial position of the armature (6);
transmitting a sensor current (I) through the central tap (23) into the first part-coil (17) of the two part-coils;
measuring at least one coil potential (U1) that is produced by the sensor current (I); and
determining an actual inductance value and the current axial position of the armature (6) with reference to the measured coil potential (U1).

12. An electromagnetic control device comprising an electric coil defining a central axis and a radially interior space,
a control element is located radially within the interior space of the electric coil,
the control element comprising an armature that is axially movable along the central axis between first and second end positions when a movement current is applied to the electric coil,
the electric coil comprising at least first and second coil parts that are axially spaced from one another by a separation zone, the first and the second coil parts are coaxially aligned along the central axis and are electrically connected in series by an electrical connector that is located axially between the first and the second coils,
an electric central tap being connected, via the electrical connector, to the first and the second coil parts, the electric central tap transmits a sensor current, via the electrical connector, to the first coil part for determining an axial position of the armature, and
in the first end position, an axial end face of the armature being aligned normal to the central axis within the separation zone between the first and the second coil parts.

13. The control device according to claim 12, wherein the electric coil is housed within a housing having axially opposed end covers, one of the axial end covers comprises a projection which axially projects into the interior space of the electric coil and stops axial movement of the armature in one of the first and the second end positions.

14. The control device according to claim 13, wherein the projection stops axial movement of the armature at the end second position.

* * * * *